(12) United States Patent
Chen et al.

(10) Patent No.: US 8,428,911 B2
(45) Date of Patent: Apr. 23, 2013

(54) TESTING METHOD AND COMPUTER DEVICE AND COMPUTER TESTING SYSTEM USING THEREOF

(75) Inventors: Te-Hsin Chen, Linkou Township (TW); Shih-Pen Chen, Yangmei Township (TW)

(73) Assignee: Quanta Computer Inc., Tao Yuan Shien (TW)

( * ) Notice: Subject to any disclaimer, the term of this patent is extended or adjusted under 35 U.S.C. 154(b) by 202 days.

(21) Appl. No.: 12/965,594

(22) Filed: Dec. 10, 2010

(65) Prior Publication Data

US 2011/0231154 A1    Sep. 22, 2011

(30) Foreign Application Priority Data

Mar. 16, 2010  (TW) ............................... 99107652 A (51) Int. Cl.
*G06F 11/30* (2006.01)
*G01P 21/00* (2006.01)
*H04L 7/00* (2006.01)

(52) U.S. Cl.
USPC .............................. 702/186; 702/86; 375/371

(58) Field of Classification Search .................. 702/186; 375/371, 373, 374
See application file for complete search history.

(56) References Cited

U.S. PATENT DOCUMENTS

| | | | | | |
|---|---|---|---|---|---|
| 5,577,079 | A | * | 11/1996 | Zenno et al. | 375/373 |
| 2009/0257321 | A1 | * | 10/2009 | Scott et al. | 368/200 |
| 2009/0262876 | A1 | * | 10/2009 | Arima et al. | 375/374 |

* cited by examiner

*Primary Examiner* — Michael Nghiem
*Assistant Examiner* — Manuel Rivera Vargas
(74) *Attorney, Agent, or Firm* — Rabin & Berdo, P.C.

(57) ABSTRACT

A testing method for carrying out an accuracy testing operation on a system time signal of a computer device under test includes the following steps. First, first and second clock cycle parameters of an operation clock signal (CPU clock) are respectively recorded in response to first and second triggering edges triggered by an external reference time signal. Next, a reference clock cycle parameter is determined according to the first and second clock cycle parameters. Then, third and fourth clock cycle parameters of the operation clock signal are respectively recorded in response to third and fourth triggering edges triggered by the system time signal. Next, a to-be-measured clock cycle parameter is obtained according to the third and fourth clock cycle parameters. Thereafter, error information of the system time signal is obtained according to the to-be-measured clock cycle parameter and the reference clock cycle parameter.

13 Claims, 8 Drawing Sheets

TESTING METHOD AND COMPUTER DEVICE AND COMPUTER TESTING SYSTEM USING THEREOF

This application claims the benefit of Taiwan application Serial No. 099107652, filed Mar. 16, 2010, the subject matter of which is incorporated herein by reference.

BACKGROUND OF THE INVENTION

1. Field of the Invention

The invention relates in general to a testing method, and more particularly to a method for testing a system time signal of a computer device under test.

2. Description of the Related Art

In the modern age, in which the technology is changing with each passing day, the computer device has become an important and indispensable platform in the human's daily life and the enterprise operation. In the existing art, a system time circuit for generating the system time signal for the computer device is disposed in the computer device. Generally speaking, the system time circuit includes an oscillator, and generates the system time signal according to the correspondingly generated oscillation signal. However, errors may be generated during the manufacturing process of the oscillator so that the correspondingly generated system time signal has several errors as compared with the standard time.

At present, the industrial standard for the system time signal of the computer device is the error within ±1 second a day. In other words, only ±11.57 ppm (Parts Per Million) is allowed. Thus, it is an important subject in the industry to provide a testing system for effectively testing whether the computer device satisfies the error standard.

SUMMARY OF THE INVENTION

The invention is directed to a computer testing system including a computer device. The computer testing system according to the invention carries out an accuracy testing operation on a system time signal of the computer device under test. The computer testing system according to the invention applies an external reference time signal, provided by a test machine, to this computer device. The computer testing system of the invention further executes a testing method through this computer device to sample the external reference time signal and the system time signal according to the operation clock signal of the computer device, to respectively obtain the corresponding to-be-tested cycle times and the reference clock cycle parameter, and to estimate the error information of the system time signal according to the to-be-tested and the reference clock cycle times. Compared with the conventional testing system, the computer testing system of the invention can effectively judge whether the system time signal of the computer device satisfies its associated standard.

According to a first aspect of the present invention, a computer testing system including a test machine and a computer device is provided. The test machine provides an external reference time signal to provide a reference time basis. The computer device includes a central processing unit (CPU) and a computer readable medium. The CPU has an operation clock signal, and reads the computer readable medium to execute a testing method to carry out an accuracy testing operation of a system time signal of the computer device under test. The testing method includes the following steps. First, a first clock cycle parameter and a second clock cycle parameter of the operation clock signal are respectively recorded in response to a first triggering edge and a second triggering edge triggered by the external reference time signal. Next, a reference clock cycle parameter is obtained according to the first and second clock cycle parameters, wherein the reference clock cycle parameter indicates cycle times of triggering the operation clock signal between the first and second triggering edges. Then, a third clock cycle parameter and a fourth clock cycle parameter of the operation clock signal are respectively recorded in response to a third triggering edge and a fourth triggering edge triggered by the system time signal. Next, a to-be-measured clock cycle parameter is obtained according to the third and fourth clock cycle parameters. The to-be-measured clock cycle parameter indicates cycle times of triggering the operation clock signal between the third and fourth triggering edges. Then, error information of the system time signal is obtained according to the to-be-measured clock cycle parameter and the reference clock cycle parameter.

According to a second aspect of the present invention, a computer device including a central processing unit (CPU) and a computer readable medium is provided. The CPU has an operation clock signal and reads the computer readable medium to execute a testing method to carry out an accuracy testing operation on a system time signal of the computer device under test. The testing method includes the following steps. First, a first clock cycle parameter and a second clock cycle parameter of the operation clock signal are respectively recorded in response to a first triggering edge and a second triggering edge of an external reference time signal. Next, a reference clock cycle parameter is obtained according to the first and second clock cycle parameters. The reference clock cycle parameter indicates cycle times of triggering the operation clock signal between the first and second triggering edges. Then, a third clock cycle parameter and a fourth clock cycle parameter of the operation clock signal are respectively recorded in response to a third triggering edge and a fourth triggering edge triggered by the system time signal. Next, a to-be-measured clock cycle parameter is obtained according to the third and fourth clock cycle parameters. The to-be-measured clock cycle parameter indicates cycle times of triggering the operation clock signal between the third and fourth triggering edges. Then, error information of the system time signal is obtained according to the to-be-measured clock cycle parameter and the reference clock cycle parameter.

According to a third aspect of the present invention, a testing method applied to a computer device under test to carry out an accuracy testing operation on a system time signal of the computer device under test is provided. The computer device under test includes a central processing unit (CPU) having an operation clock signal. The testing method includes the following steps. First, a first clock cycle parameter and a second clock cycle parameter of the operation clock signal are respectively recorded in response to a first triggering edge and a second triggering edge triggered by an external reference time signal provided by a test machine. Next, a reference clock cycle parameter is obtained according to the first and second clock cycle parameters. The reference clock cycle parameter indicates cycle times of triggering the operation clock signal between the first and second triggering edges. Then, a third clock cycle parameter and a fourth clock cycle parameter of the operation clock signal are respectively recorded in response to a third triggering edge and a fourth triggering edge triggered by the system time signal. Next, a to-be-measured clock cycle parameter is obtained according to the third and fourth clock cycle parameters. The to-be-measured clock cycle parameter indicates cycle times of triggering the operation clock signal between the third and fourth triggering edges. Then, error information of the system time signal is obtained according to the to-be-measured clock cycle parameter and the reference clock cycle parameter.

The above and other aspects of the invention will become better understood with regard to the following detailed description of the preferred but non-limiting embodiment(s). The following description is made with reference to the accompanying drawings.

DETAILED DESCRIPTION OF THE INVENTION

The computer testing system according to the embodiment of the invention carries out an associated test operation on a system time signal in response to an external reference time signal, provided by a test machine.

Figure 1:
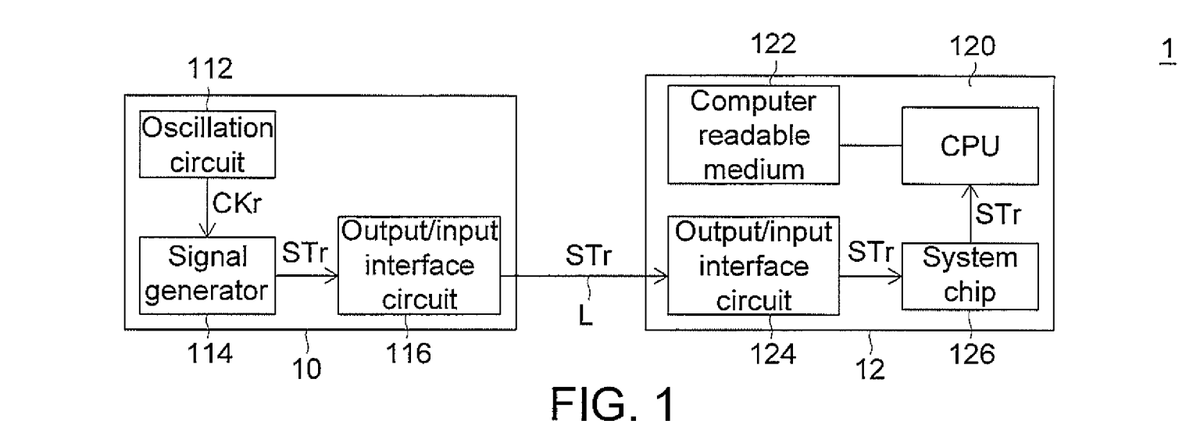
FIG. 1 is a block diagram showing a computer testing system according to an embodiment of the invention.

FIG. 1 is a block diagram showing a computer testing system 1 according to an embodiment of the invention. Referring to FIG. 1, the computer testing system 1 includes a test machine 10 and a computer device 12. The test machine 10 provides an external reference time signal STr to provide a reference time basis. The computer device 12 is a to-be-tested system, which carries out a test operation on a system time signal CKs thereof in response to the external reference time signal STr.

The test machine 10 includes an oscillation circuit 112, a signal generator 114 and an input/output interface circuit 116. The oscillation circuit 112 provides a reference clock signal CKr. For example, the oscillation circuit 112 is an oven controlled crystal oscillator (OCXO), which can eliminate the influences of the environmental temperature variation on its oscillation frequency to provide the reference clock signal CKr having the ±0.1 ppm of frequency stability. In one operation example, the reference clock signal CKr has the frequency of 10 MHz (Mega Hertz).

Figure 2:
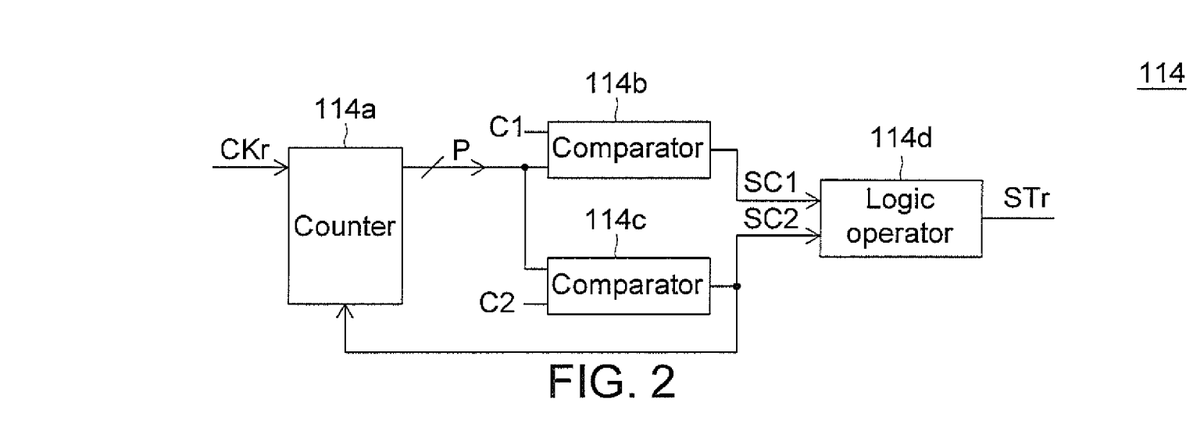
FIG. 2 is a detailed block diagram showing a signal generator of FIG.

The signal generator 114 generates the external reference time signal STr according to the reference clock signal CKr. FIG. 2 is a detailed block diagram showing the signal generator 114 of FIG. 1. Referring to FIG. 2, for example, the signal generator 114 includes a counter 114a, comparators 114b and 114c and a logic operator 114d. The counter 114a counts to obtain a count parameter P in response to the reference clock signal CKr, and resets the count parameter P in response to a first signal level of a control signal SC2. In one operation example, the counter 114a is a 24-bit rising edge triggered counter, controlled by the reference clock signal CKr to obtain the 24-bit count parameter P, wherein the count parameter P is the number of the accumulated cycles.

The comparator 114b compares the count parameter P with a comparison parameter C1, outputs a control signal SC1 corresponding to the first level when the count parameter P is greater than or equal to the comparison parameter C1, and outputs the control signal SC1 corresponding to the second level when the count parameter P is smaller than the comparison parameter C1. The comparator 114c compares the count parameter P with a comparison parameter C2, outputs the control signal SC2 corresponding to the first level when the count parameter P is greater than or equal to the comparison parameter C2, and outputs the control signal SC2 corresponding to the second level when the count parameter P is smaller than the comparison parameter C2. For example, the first level is a high signal level, while the second level is a low signal level.

The logic operator 114d triggers the triggering edge of the external reference time signal STr in response to the control signals SC1 and SC2 corresponding to the same level, and triggers the inverse triggering edge of the external reference time signal STr in response to the control signals SC1 and SC2 corresponding to different levels to thus generate the external reference time signal STr. For example, the triggering edge and the inverse triggering edge of the external reference time signal STr are respectively a rising edge and a falling edge.

Figure 3:
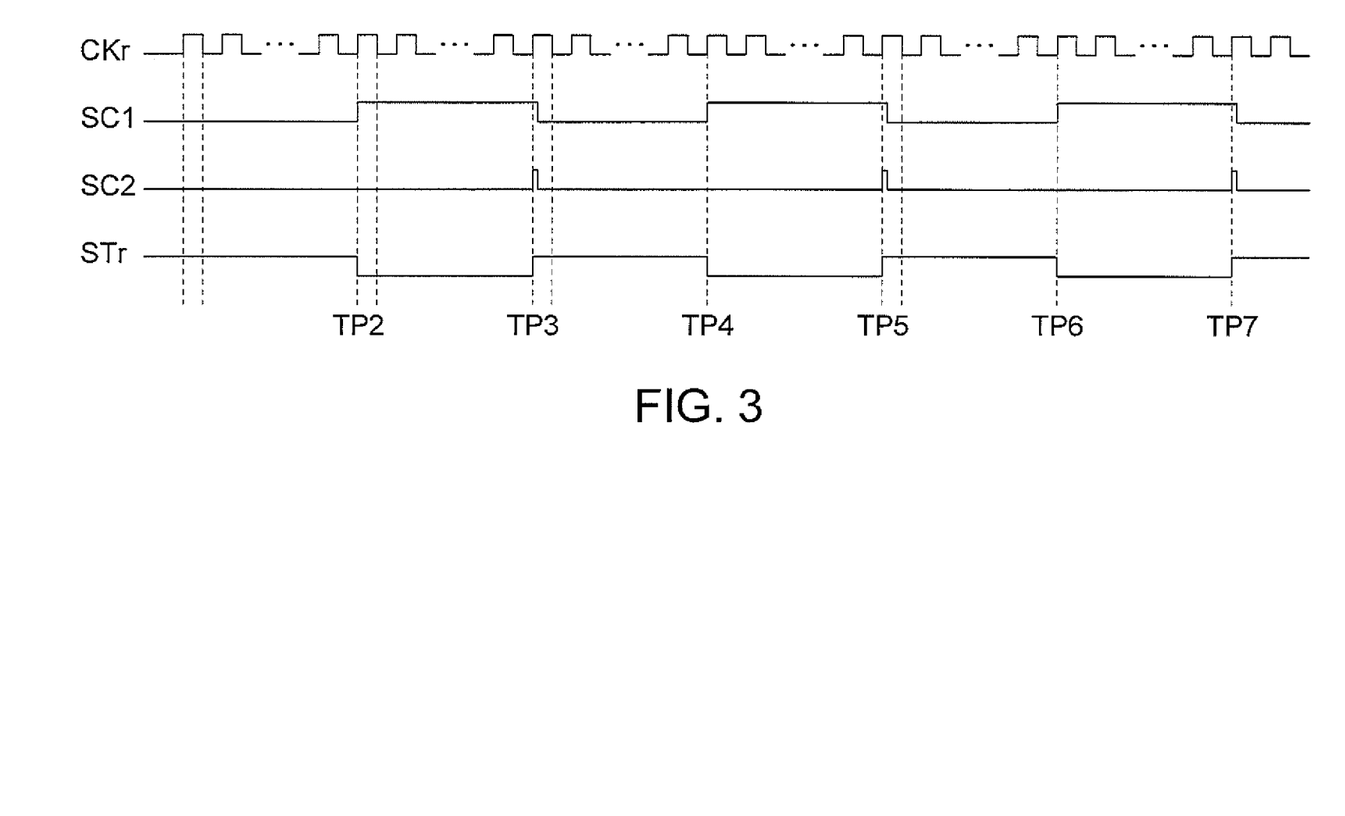
FIG. 3 is a timing chart showing associated signals of the signal generator 114 of FIG. 2.

FIG. 3 is a timing chart showing associated signals of the signal generator 114 of FIG. 2. In one operation example, the counter 114a starts carrying out the counting operation of the count parameter P at a rising-edge trigger time point TP1 of a first cycle of the reference clock signal CKr, while the comparison parameters C1 and C2 are respectively equal to the value $(5000000)_{10}$ and $(10000000)_{10}$. Thus, the control signal SC1 rises from the second signal level (i.e., the low signal level) to the first signal level (i.e., the high signal level) at a rising-edge trigger time point TP2 of the $(5 \times 10^6)^{th}$ cycle of the reference clock signal CKr. The logic operator 114d triggers the inverse triggering edge (i.e., the falling edge) of the external reference time signal STr in response to the control signals SC1 and SC2 corresponding to different signal levels.

At a rising-edge trigger time point TP3 of the $(10^7)^{th}$ cycle of the reference clock signal CKr, the control signal SC2 rises from the second signal level (i.e., low signal level) to the first signal level (i.e., high signal level) to control the counter 114a to reset the count parameter P to the value 0. Then, the comparators 114b and 114c respectively output the control signals SC1 and SC2 corresponding to the second signal level (i.e., low signal level) in response to the count parameter P with the value 0; and the logic operator 114d triggers the triggering edge (i.e., rising edge) of the external reference time signal STr in response to the control signals SC1 and SC2 corresponding to the same signal level.

The operations similar to the operation time points TP2 and TP3 are also respectively repeatedly triggered at the even-number ordered operation time points TP4, TP6, . . . and the odd-number ordered operation time points TP5, TP7, . . . , so that the external reference time signal STr of the rising edge/falling edge is triggered once every $5 \times 10^6$ cycles of the reference clock signal CKr. In other words, the external reference time signal STr with the frequency of 1 Hz is obtained.

In one operation example, the signal generator 114 is implemented by a complex programmable logic device (CPLD) circuit to output the external reference time signal STr satisfying the transistor-transistor logic (TTL) operation voltage specification.

The input/output interface circuit 116 outputs the external reference time signal STr to the computer device 12 through a communication path L. For example, the communication path L is a network path, while the input/output interface circuit 116 includes a TTL recommendation standard 232 (RS232) interface signal converter for carrying out signal conversion on the external reference time signal STr.

The computer device 12 includes a CPU 120, a computer readable medium 122, an input/output interface circuit 124 and a system chip 126. The input/output interface circuit 124 receives the external reference time signal STr, provided by the test machine 10, through the communication path L. For example, the input/output interface circuit 124 includes the RS232 to communication port (Com Port) signal converter for converting the external reference time signal STr, received through the communication path L, into the signal with the signal format compatible with the communication port. The system chip 126 is, for example, a south bridge chip for providing the external reference time signal STr, converted by the input/output interface circuit 124, to the CPU 120.

The CPU 120 has an operation clock signal (CPU Clock) CPU_CLK. The CPU 120 reads program codes, stored in the computer readable medium 122, to execute the testing method to carry out the accuracy testing operation on the system time signal CKs. In one example, the CPU 120 executes the testing method, as shown in the flow chart of FIG. 4.

Figure 4:
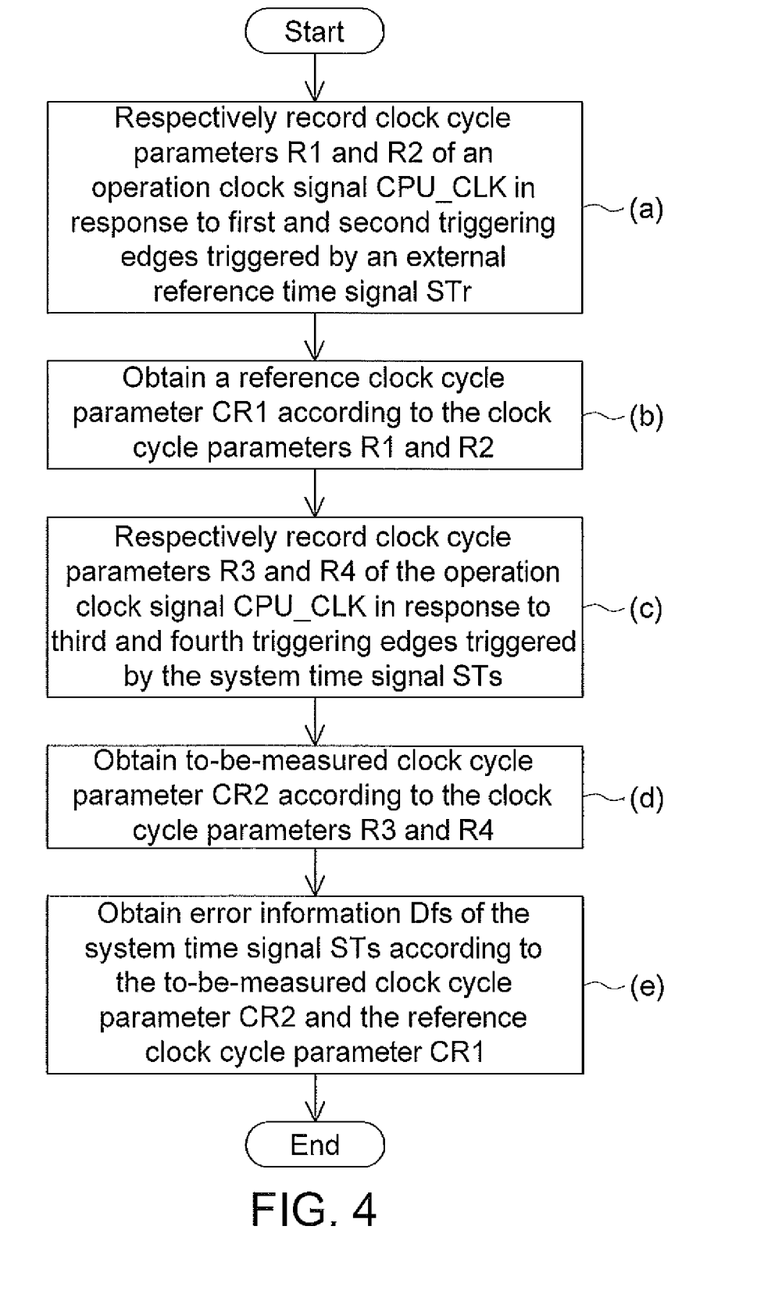
FIG. 4 is a flow chart showing a testing method according to an embodiment of the invention.

First, as shown in step (a), the CPU 120 respectively records the clock cycle parameters R1 and R2 of the operation clock signal CPU_CLK in response to the first triggering edge (e.g., rising edge) and the second triggering edge (e.g., rising edge) triggered by the external reference time signal STr. The first and second triggering edges of the external reference time signal STr define an operation period defined on the basis of the external reference time signal STr. The first and second triggering edges respectively correspond to a starting time point and an ending time point of this operation period. Next, as shown in step (b), the CPU 120 obtains a reference clock cycle parameter CR1 according to the clock cycle parameters R1 and R2, wherein the reference clock cycle parameter CR1 indicates the trigger cycle times obtained in this operation period by actually sampling the operation clock signal CPU_CLK.

Then, as shown in step (c), the CPU 120 respectively records the clock cycle parameters R3 and R4 of the operation clock signal CPU_CLK in response to the third triggering edge (e.g., rising edge) and the fourth triggering edge (e.g., rising edge) triggered by a system time signal STs. The third and fourth triggering edges of the system time signal STs define an operation period, defined on the basis of the system time signal STs. The third and fourth triggering edges respectively correspond to the starting time point and the ending time point of the operation period. Next, as shown in step (d), the CPU 120 obtains a to-be-measured clock cycle parameter CR2 according to the clock cycle parameters R3 and R4, wherein the to-be-measured clock cycle parameter CR2 indicates the cycle times of triggering the operation clock signal CPU_CLK between the third and fourth triggering edges.

Next, as shown in step (e), the CPU 120 obtains the error information Dfs of the system time signal STs according to the to-be-measured clock cycle parameter CR2 and the reference clock cycle parameter CR1. For example, the CPU 120 executes the operation of the following equation to obtain the error information Dfs:

$$Dfs = \frac{CR2 - CR1}{CR1} \times 10^6$$

wherein the error information Dfs is in the unit of ppm.

Figure 5:
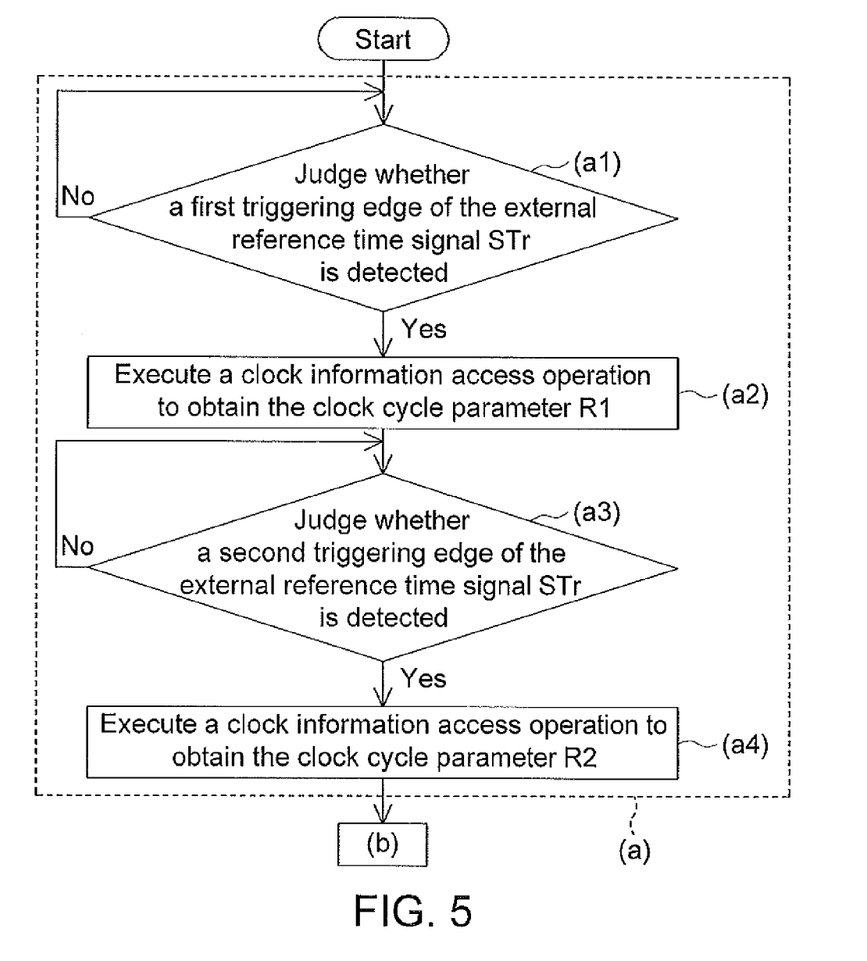
FIG. 5 is a partial flow chart showing the testing method according to the embodiment of the invention.

In one example, the step (a) of the testing method of this embodiment includes sub-steps (a1) to (a4), as shown in FIG. 5. As shown in the step (a1), the CPU 120 judges whether the first triggering edge of the external reference time signal STr is detected. If not, the step (a1) is repeated. If yes, the step (a2) is performed so that the CPU 120 executes a clock information access operation to obtain a clock cycle parameter R1. Then, as shown in the step (a3), the CPU 120 judges whether the second triggering edge of the external reference time signal STr is detected. If not, the step (a3) is repeated. If yes, the step (a4) is performed so that the CPU 120 executes the clock information access operation to obtain a clock cycle parameter R2.

Figure 6:
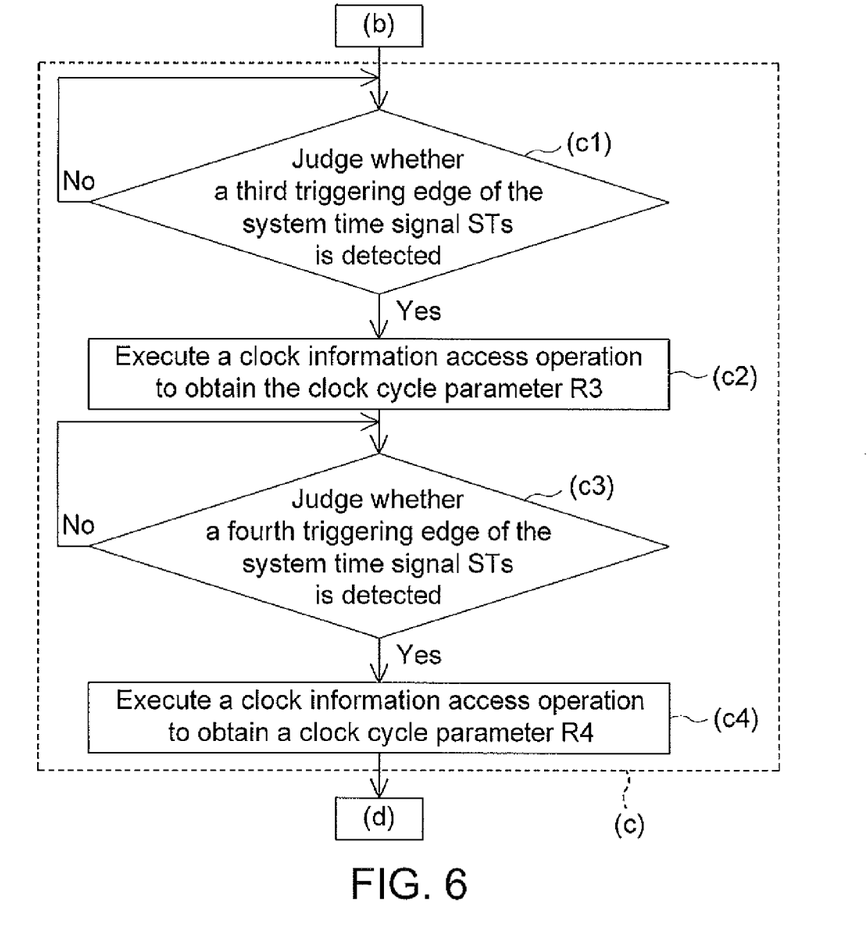
FIG. 6 is a partial flow chart showing the testing method according to the embodiment of the invention.

In one example, the step (c) of the testing method of this embodiment includes steps (c1) to (c3), as shown in FIG. 6. As shown in the step (c1), the CPU 120 judges whether the third triggering edge of the system time signal STs is detected. If not, the step (c1) is repeated. If yes, the step (c2) is performed so that the CPU 120 executes the clock information access operation to obtain a clock cycle parameter R3. Then, as shown in the step (c3), the CPU 120 judges whether the fourth triggering edge of the system time signal STs is detected. If not, the step (c3) is repeated. If yes, the step (c4) is performed so that the CPU 120 executes the clock information access operation to obtain a clock cycle parameter R4.

For example, the CPU 120 executes a polling operation to continuously judge whether the triggering edge of the external reference time signal STr is detected in the steps (a1) and (a3), and continuously judge whether the triggering edge of the system time signal STs is detected in the steps (c1) and (c3). For example, the CPU 120 is a processor supporting the x86 instruction set architecture, and the CPU 120 respectively obtains the clock cycle parameters R1 and R2 in the steps (a2) and (a4), and respectively obtains the clock cycle parameters R3 and R4 in the steps (c2) and (c4) by executing a read time stamp counter (RDTSC) instruction in the x86 instruction set architecture, for example.

Figure 7:
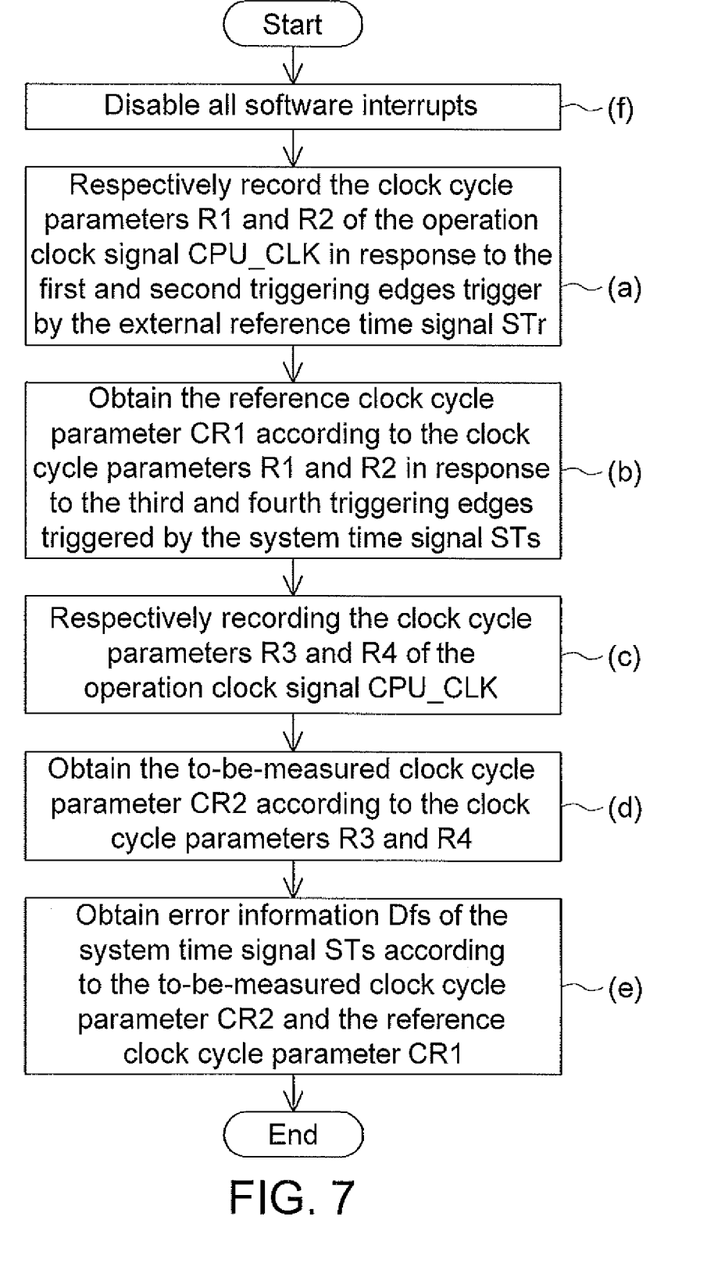
FIG. 7 is another flow chart showing the testing method according to the embodiment of the invention.

In one example, the testing method of this embodiment further includes the step (f) before the steps (a) to (e), as shown in FIG. 7. In the step (f), the CPU 120 disables all software interrupts to prevent other software interrupts from affecting the testing method executed by the CPU 120 in the steps (a) to (e). In one example, the testing method of this embodiment is executed in a non-time division multiplexing (non-TDM) operation system environment to avoid the inaccurate test result caused by the operation delay in each test step.

Figure 8:
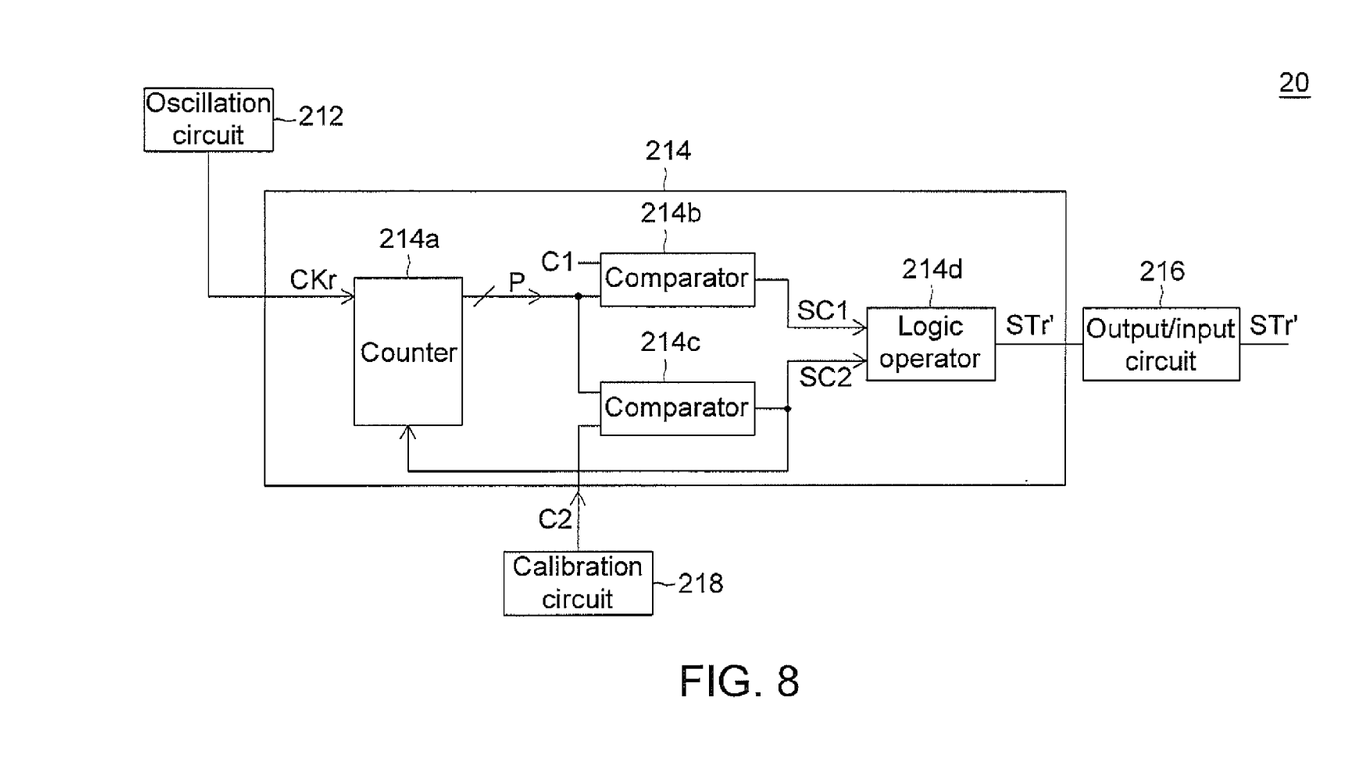
FIG. 8 is another block diagram showing a test machine according to the embodiment of the invention.

In this illustrated embodiment, the test machine 10 has the circuit structure shown in FIG. 2. However, the test machine 10 according to the embodiment of the invention is not limited thereto, and may further have other types of circuit structures. For example, a test machine 20 may further include a calibration circuit 218 for adjusting the comparison parameter C2 according to the calibration value Ad to carry out an error calibrating operation on the frequency of the reference clock signal CKr, as shown in FIG. 8.

For example, when the reference clock signal CKr has the error of +0.3 ppm, it represents that the reference clock signal CKr has the excess 0.3 cycles every million clock cycles with respect to the accurate 10 MHz signal. In other words, three excess cycles are obtained every second. Thus, the calibration circuit 218 can calibrate the comparison parameter C2 from the original value $10^7$ into the value $10^7$-3 (i.e., 9999997), such that the external reference time signal STr, generated according to the +0.3 ppm reference clock signal CKr, still precisely has the cycle length of one second (i.e., corresponding to the frequency of 1 Hz). Thus, the frequency error of the reference clock signal CKr can be eliminated through the calibrating operation of the calibration circuit 218 on the comparison parameter C2, such that the correspondingly generated external reference time signal STr can precisely correspond to the operation frequency for the user's design.

Figure 9:
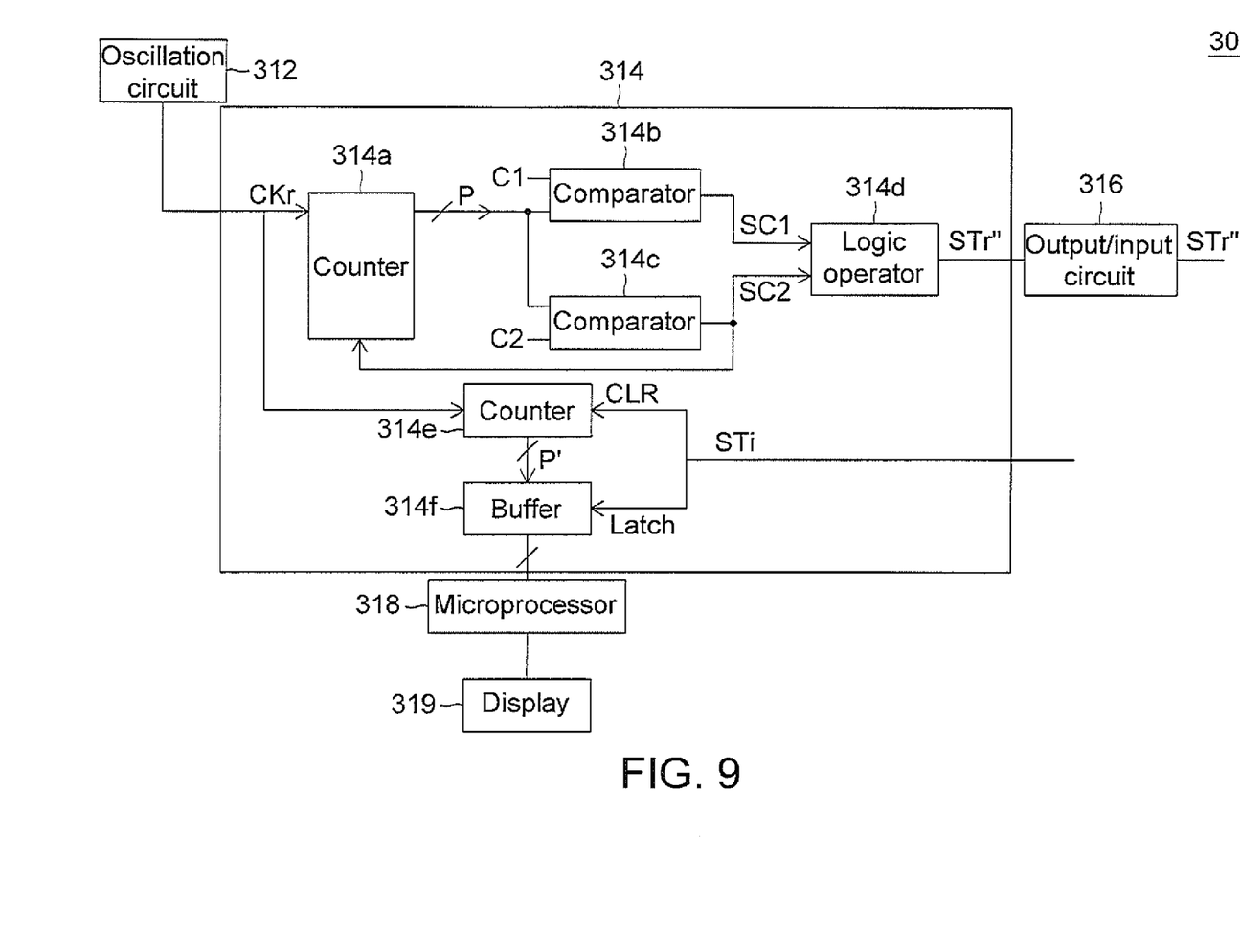
FIG. 9 is still another block diagram showing a test machine according to the embodiment of the invention.

In another example, a test machine 30 may further include a counter 314e and a buffer 314f, and the test machine 30 receives an input time signal STi and carries out the associated accuracy measurement operation on the input time signal STi, as shown in FIG. 9. The counter 314e counts to obtain the count parameter P' in response to the reference clock signal CKr, and resets the count parameter P' in response to the triggering edge of the input time signal STi. The buffer 314f temporarily stores the count parameter P' counted by the counter, and latches the count parameter P' in response to the triggering edge of the input time signal STi.

The test machine 30 further includes a microprocessor 318 for measuring the input time signal STi according to the count parameter P'. For example, the microprocessor 318 can obtain the operation frequency of the input time signal STi according to the count parameter P' and the frequency of the reference clock signal CKr. In one example, the test machine 30 further includes a display 319 for displaying the operation executed by the microprocessor 318 and the associated operation result. Thus, the user can obtain the cycle and the frequency information of the input time signal STi.

The computer testing system according to the embodiment applies an external reference time signal, provided by a test machine, to this computer device. The computer testing system of the embodiment further executes a testing method through this computer device to sample the external reference time signal and the system time signal according to the operation clock signal of the computer device, to respectively obtain the corresponding to-be-tested cycle times and the reference clock cycle parameter, and to estimate the error information of the system time signal according to the to-be-tested and the reference clock cycle times. Compared with the conventional testing system, the computer testing system of the embodiment can effectively judge whether the system time signal of the computer device satisfies its associated standard.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer testing system, comprising:
a test machine for providing an external reference time signal to provide a reference time basis; and
a computer device, comprising:
a central processing unit (CPU) having an operation clock signal; and
a computer readable medium, wherein the CPU reads the computer readable medium to execute a testing program to carry out an accuracy testing operation of a system time signal of the computer device under test, and the testing program comprises instructions, which when executed by the CPU, cause the CPU to:
respectively record a first clock cycle parameter and a second clock cycle parameter of the operation clock signal in response to a first triggering edge and a second triggering edge triggered by the external reference time signal;
obtain a reference clock cycle parameter according to the first and second clock cycle parameters, wherein the reference clock cycle parameter indicates cycle times of triggering the operation clock signal between the first and second triggering edges;
respectively record a third clock cycle parameter and a fourth clock cycle parameter of the operation clock signal in response to a third triggering edge and a fourth triggering edge triggered by the system time signal;
obtain a to-be-measured clock cycle parameter according to the third and fourth clock cycle parameters, wherein the to-be-measured clock cycle parameter indicates cycle times of triggering the operation clock signal between the third and fourth triggering edges; and
obtain error information of the system time signal according to the to-be-measured clock cycle parameter and the reference clock cycle parameter.

2. The computer testing system according to claim 1, wherein the test machine comprises:
an oscillation circuit for providing a reference clock signal;
a signal generator, comprising:
a first counter for counting a first count parameter in response to the reference clock signal;
a first comparator for outputting a first control signal corresponding to a first level when the first count parameter is greater than or equal to a first comparison parameter;
a second comparator for outputting a second control signal corresponding to the first level when the first count parameter is greater than or equal to a second comparison parameter; and
a logic operator for triggering a triggering edge of the external reference time signal in response to the first and second control signals corresponding to the same level, triggering an inverse triggering edge of the external reference time signal in response to the first and second control signals corresponding to different levels, and thus generating the external reference time signal; and
a first input/output interface circuit for outputting the external reference time signal to the computer device;
wherein the first counter further resets the first count parameter in response to the second control signal corresponding to the first level.

3. The computer testing system according to claim 2, wherein the test machine further comprises:
a calibration circuit for adjusting the second comparison parameter according to a calibration value to carry out an error calibrating operation on a frequency of the reference clock signal.

4. The computer testing system according to claim 2, wherein the test machine further measures an input time signal, and the signal generator comprises:
a second counter for counting a second count parameter in response to the reference clock signal and resetting the second count parameter in response to a triggering edge of the input time signal; and
a buffer for temporarily storing the second count parameter counted by the second counter and latching the second count parameter in response to the triggering edge of the input time signal;

wherein the test machine further comprises a microprocessor for measuring the input time signal according to the second count parameter.

5. The computer testing system according to claim 1, wherein when the CPU records the first and second clock cycle parameters, the CPU further reads the computer readable medium to execute sub-instructions comprised in the testing program, and the sub-instructions cause the CPU to:
judge whether the first triggering edge is detected;
execute a clock information access operation to obtain the first clock cycle parameter when the first triggering edge is detected;
judge whether the second triggering edge is detected; and
execute the clock information access operation to obtain the second clock cycle parameter when the second triggering edge is detected.

6. The computer testing system according to claim 1, wherein when the CPU records the third and fourth clock cycle parameters, the CPU further reads the computer readable medium to execute sub-instructions comprised in the testing program, and the sub-instructions cause the CPU to:
judge whether the third triggering edge is detected;
execute a clock information access operation to obtain the third clock cycle parameter when the third triggering edge is detected;
judge whether the fourth triggering edge is detected; and
execute the clock information access operation to obtain the fourth clock cycle parameter when the fourth triggering edge is detected.

7. A computer device, comprising:
a central processing unit (CPU) having an operation clock signal; and
a computer readable medium, wherein the CPU reads the computer readable medium to execute a testing program to carry out an accuracy testing operation on a system time signal of the computer device under test, and the testing program comprises instructions, which when executed by the CPU, cause the CPU to:
respectively record a first clock cycle parameter and a second clock cycle parameter of the operation clock signal in response to a first triggering edge and a second triggering edge of an external reference time signal;
obtain a reference clock cycle parameter according to the first and second clock cycle parameters, wherein the reference clock cycle parameter indicates cycle times of triggering the operation clock signal between the first and second triggering edges;
respectively record a third clock cycle parameter and a fourth clock cycle parameter of the operation clock signal in response to a third triggering edge and a fourth triggering edge triggered by the system time signal;
obtain a to-be-measured clock cycle parameter according to the third and fourth clock cycle parameters, wherein the to-be-measured clock cycle parameter indicates cycle times of triggering the operation clock signal between the third and fourth triggering edges; and
obtain error information of the system time signal according to the to-be-measured clock cycle parameter and the reference clock cycle parameter.

8. The computer device according to claim 7, wherein when the CPU records the first and second clock cycle parameters, the CPU further reads the computer readable medium to execute sub-instructions comprised in the testing program, and the sub-instructions cause the CPU to:
judge whether the first triggering edge is detected;
execute a clock information access operation to obtain the first clock cycle parameter when the first triggering edge is detected;
judge whether the second triggering edge is detected; and
execute the clock information access operation to obtain the second clock cycle parameter when the second triggering edge is detected.

9. The computer device according to claim 7, wherein when the CPU records the third and fourth clock cycle parameters, the CPU further reads the computer readable medium to execute sub-instructions comprised in the testing program, and the sub-instructions cause the CPU to:
judge whether the third triggering edge is detected;
execute a clock information access operation to obtain the third clock cycle parameter when the third triggering edge is detected;
judge whether the fourth triggering edge is detected; and
execute the clock information access operation to obtain the fourth clock cycle parameter when the fourth triggering edge is detected.

10. The computer device according to claim 7, wherein the external reference time signal is provided by a test machine.

11. A testing method used in a computer device under test to carry out an accuracy testing operation on a system time signal of the computer device under test, the computer device under test comprising a central processing unit (CPU), the CPU having an operation clock signal, the testing method comprising the steps of:
respectively recording a first clock cycle parameter and a second clock cycle parameter of the operation clock signal in response to a first triggering edge and a second triggering edge triggered by an external reference time signal provided by a test machine;
obtaining a reference clock cycle parameter according to the first and second clock cycle parameters, wherein the reference clock cycle parameter indicates cycle times of triggering the operation clock signal between the first and second triggering edges;
respectively recording a third clock cycle parameter and a fourth clock cycle parameter of the operation clock signal in response to a third triggering edge and a fourth triggering edge triggered by the system time signal;
obtaining a to-be-measured clock cycle parameter according to the third and fourth clock cycle parameters, wherein the to-be-measured clock cycle parameter indicates cycle times of triggering the operation clock signal between the third and fourth triggering edges; and
obtaining error information of the system time signal according to the to-be-measured clock cycle parameter and the reference clock cycle parameter.

12. The testing method according to claim 11, wherein the step of recording the first and second clock cycle parameters comprises the sub-steps of:
judging whether the first triggering edge is detected;
executing a clock information access operation to obtain the first clock cycle parameter when the first triggering edge is detected;
judging whether the second triggering edge is detected; and
executing the clock information access operation to obtain the second clock cycle parameter when the second triggering edge is detected.

13. The method according to claim 11, wherein the step of recording the third and fourth clock cycle parameters comprises the sub-steps of:
   judging whether the third triggering edge is detected;
   executing a clock information access operation to obtain the third clock cycle parameter when the third triggering edge is detected;
   judging whether the fourth triggering edge is detected; and
   executing the clock information access operation to obtain the fourth clock cycle parameter when the fourth triggering edge is detected.

* * * * *